United States Patent Office 2,987,500
Patented June 6, 1961

2,987,500
PROCESS FOR THE PRODUCTION OF POLY-METHACRYLIC ACID ESTERS
Carlo Rossetti, 13 Kirschgassenweg, Aarau, Switzerland
No Drawing. Filed May 3, 1957, Ser. No. 656,763
10 Claims. (Cl. 260—45.5)

This invention relates to the polymerization of unsaturated vinylidene compounds, and it especially relates to improvements of polymerization processes in the production of vinylidene polymers useful in dental preparations.

The most important vinylidene compounds which may be used in this invention are the methacrylates, i.e. the esters of methacrylic acid, such as the methyl, ethyl or other alkyl esters or the methacrylic esters of polyhydric alcohols, such as ethylene glycol or glycerol, and mixtures of the said esters.

This application is a continuation-in-part of U.S. application Serial No. 384,344, filed October 5, 1953, and of U.S. application Serial No. 411,277, filed February 18, 1954, both now abandoned.

It has, heretofore, been known to use mixtures of monomeric materials and polymerized materials in the preparation of vinylidene polymers, especially where the vinylidene polymers comprise methacrylic acid methyl ester, etc. By this process, a doughy or pasty mass, which may easily be polymerized in molds, may be prepared from the liquid monomer and the comminuted polymer, which is preferably pulverulent.

The above process is satisfactory for the manufacture of various molded structures, where the necessity of relatively long polymerization periods and relatively high polymerization temperatures is not a problem. In these cases, the use of polymerization accelerators such as peroxides is satisfactory.

However, where it is necessary to prepare the polymers in as short a time as possible, and without the use of relatively higher temperatures, as for example, in the preparation of fillings or other dental work which must be done in the mouth of the patient, the above type of process cannot readily be used.

It has, heretofore, been proposed to use teritary amines as polymerization accelerators. These tertiary amines, however, deleteriously effect the color-fasteness of the resultant polymers. In order to overcome this disadvantage it has been proposed to use sulfinic acids as polymerization catalysts.

It is, moreover, essential in dentistry to provide compositions which are as simple and easy as possible to handle.

The above disadvantages can be overcome according to this invention in several ways. One of these ways consists in conducting the polymerization in the presence of a relatively insoluble salt of a sulfinic acid and an alkali or ammonium chloride or sulfate as well as an acid. A quaternary ammonium salt may also be added or substituted for the alkali or ammonium chloride or sulfate.

Another efficient process according to this invention consists in performing the polymerization in the presence of sulfinic acids or of salts or other derivatives thereof in the simultaneous presence of quaternary bases or salts. In this process, it is not necessary to use only the relatively insoluble sulfinic acid salts. According to this invention, aliphatic as well as aromatic sulfinic acids such as laurylsulfinic acid, benzenesulfinic acid, toluenesulfinic acid, naphthalenesulfinic acid, etc., or their salts with alkali or alkali earth metals, or their ammonium salts, or other derivatives of such sulfinic acids may be used, such as, for example, ammonium benzenesulfinate.

As quaternary bases or salts, it is preferred to use the ammonium bases and salts. These may take the form of compounds having either the lower or higher alkyl, aryl or aralkyl radicals; these radicals being either substituted or unsubstituted. The compounds having at least one aryl or arylkyl or higher alkyl radicals are preferred. Either pure or mixed alkylated and arylated or aralkylated compounds may be used, such as tetraalkyl ammonium salts, tetraaryl or tetraaralkyl ammonium compounds, or trialkyl-monoaryl or trialkyl-monoaralkyl ammonium salts. It should be further noted that the alkyl, aryl or aralkyl radicals may be either the same or different.

Insofar as the quaternary salts are concerned, the particular type of salt-forming acid radical is not important. For example, diisobutyl-phenoxyethoxyethyl-dimethylbenzyl-ammonium - hydroxide, tetrabenzylammoniumchloride, tributylestearylammonium-chloride, diisobutyl-phenoxyethoxyethyl - dimethylbenzyl - ammomium-chloride and lauryldibutylbenzylammoniumchloride have proved satisfactory.

Instead of ammonium bases and salts other quaternary compounds may also be employed as, for example, the salts of quaternary ethyleneimine bases.

Where the process consists of the use of a relatively insoluble sulfinic acid salt, such salts may take the form of alkaline earth salts such as calcium or strontium salts of aliphatic and aromatic sulfinic acids, e.g. calcium benzene sulfinate or strontium benzene sulfinate, as well as corresponding salts of toluene sulfinic acid, naphthalene sulfinic acid, etc. It is also possible to use various combinations of such salts.

Among the alkali or ammonium chlorides or sulfates, which may be used, can be mentioned sodium chloride, ammonium chloride, sodium sulfate, ammonium sulfate and combinations of such salts such as potassium chloride and sodium sulfate.

Instead of using a quaternary ammonium compound and a sulfinate, it is also possible to use the sulfinic acid salt of the quaternary ammonium base; whereby the same effect is obtained as by adding the quaternary ammonium compound and a sulfinate of another base. For instance, there can advantageously be used the diisobutyl-phenoxyethoxyethyl - dimethylbenzyl - ammoniumbenzo sulfinate or the stearyldimethylbenbylammonium-toluene sulfinite.

In cases where alkali metal or alkaline earth metal sulfinates are employed, the polymerization must be carried out in the presence of an acid, such as phosphoric acid, hypophosphorous acid or boric acid, and if desired an alkali or alkali earth metal salt, especially an alkali chloride or sulfate. In these cases, too, a quaternary base or salt should, according to the invention, always be present, since it is primarily this compound which is responsible for the acceleration of the polymerization, that can be observed in all cases of the simultaneous use of sulfinic acids (or their salts or other derivatives) and quaternary compounds.

Instead of, or in addition to, such other acid, e.g. phosphoric acid, there can be added to the mixture to be polymerized, an amount of free methacrylic acid. In this manner, for instance, the polymer made from monomeric methacrylic acid ethyl ester in the presence of powderous polymethylmethacrylate has an improved adhesive affinity for the base upon which the polymerization is being carried out, e.g. in the cavity of a tooth in which a filling is being made by the polymerization.

Another advantage of the use of an addition of free methacrylic acid consists in a further abbreviation of the polymerization period and in an increased hardness of the polymerization product.

It has also been found that the polymerization process can further be favorably influenced by using, in addition to a sulfinic acid, or a salt or other derivatives thereof, and a quaternary base or salt, an addition of between 0 and 20 percent of a methacrylate of a polyhydric alcohol, for instance, of glycol, glycerine, pentaerythrite, sorbitol etc. By such addition, the sensitivity of the polymerization process to small amounts of humidity or of water is greatly diminished. In the absence of such addition of a methacrylate of a polyhydric alcohol, any small amount of humidity present during the polymerization would be of detrimental influence upon the length of the polymerization period and upon the hardness of the product of the polymerization. Furthermore, this addition considerably improves the mechanical properties of the polymerization product, especially its hardness. This may be due to an intramolecular cross-linkage between what would otherwise probably be only lengthwise polymerized products.

It has been found that the use of a sulfinic acid, or of a salt or other derivative thereof with an acid, together with a quaternary base or salt, causes the polymerization of a pasty mixture of a monomeric liquid compound and a pulverulent polymer to take place in a short time and at relatively low temperatures; for instance, between about 8 to 10 minutes at a room temperature of 18 to 20° C. or for even shorter periods at temperatures of about 30 to 35° C.

In the above manner, in the processes of the present invention, the difficulties which hitherto arose when trying to use sulfinic acids as catalysts, have been overcome. This is especially true in the case where the combination of quaternary salts or bases and a sulfinic acid, or a salt or other derivative thereof, is used.

Another advantage due to the presence of quaternary bases or quaternary salts in the polymerization process is the essential reduction of the amount of the sulfinic acid or the sulfinates used, when compared with the amount of sulfinic acid necessary in the known process using sulfinic acid contaminated with alkali metal chloride. Such reduction, which may amount to as much as one-tenth of the amount of sulfinic acid which must be used otherwise in order to obtain the same polymerization effect, involves numerous advantages. In the odontological domain, these advantages comprise a markedly improved color stability against ultraviolet radiation, an essentially higher water resistance of the polymers, and a markedly reduced danger of damage inflicted on the pulps by the sulfinic acid.

The processes of the present invention are particularly adapted for processing the monomeric methacrylic acid methyl ester together with its polymer as, for example, in dentistry, for the preparation of prosthesis, dentures, inlays, fillings, artificial teeth and in repair work.

However, the present invention is not restricted to this special field of polymerizing an unsaturated organic compound in the presence of a comminuted polymer. It is, likewise, applicable to any other polymerization process, such as the polymerization of a monomer using an emulsified monomeric compound, or to the polymerization of the monomeric compound by itself, so-called polymerization in substance of "block-polymerization." In these cases, too, the polymerization process is greatly improved when it is carried out in the presence of a sulfinic acid, its salts or other derivatives, and of quaternary bases or salts, with or without the addition of the other substances mentioned above. Advantages reached hereby comprise for instance shorter polymerization periods and lower polymerization temperatures.

The relative amounts of the individual substances as well as the manner of adding them to the polymerizing mixture depends, in particular, on the intended use of the resultant polymer. For polymerizing a monomer in the presence of a comminuted polymer, part of the added materials may first be added to the liquid monomer; and then the polymer, preferably in the form of a powder, and containing the rest of the additional substances, may be added in such amounts as to provide, on mixing, a mass which remains more or less plastic and can, therefore, be formed to the desired final shape.

For use in dentistry, i.e. for the preparation of dentures, or fillings, or the like, the quaternary ammonium salt may be dissolved or suspended in the liquid monomer, or in the powderous polymer or in both, and the acid or acids may be added; this composition is thoroughly stable, it can be excellently stored, and, in particular, does not tend, in any way, to polymerize. The pulverized polymer, which should be present during the polymerization, is preferably mixed with the salt of the sulfinic acid and, if desired, the chloride or sulfate, and, in this manner, another stable, storable composition is obtained.

For such a dental preparation, without the co-use of quaternary ammonium salt, 5 to 10% by weight of calcium benzenesulphinate and approximately 0.5 to 10% by weight of alkali metal-chloride or ammonium-chloride or -sulphate may be added to the pulverulent methyl ester of polymethacrylic acid; chloride or sulphate is thereby preferably used in the lower range of these quantities, since larger quantities of the salt offer no advantage. Approximately 0.1 to 2% by weight of quaternary ammonium salt and, e.g. 0.1 to 2% by weight of phosphoric acid are added to the liquid monomer which about in the same quantity as the polymer serves for the preparation of the plastic-formable starting material of polymerization.

A special advantage of the process consists in that when using quaternary ammonium salts as polymerization accelerators, the quantity of the sulfinic acid or of the sulfinates and of the acid in whose presence the process takes place, may be considerably reduced. It has been found that in this case the polymerization time remains the same even if the quantity of the acid and the quantity of the sulfinate is reduced to as little as one tenth of the quantity required without the co-use of the quaternary ammonium salts, e.g. 5 to 10 minutes at room temperature. The properties of the polymers are considerably deteriorated by the addition of higher portions of the catalyst. In other words, where there is a higher sulphinate content, the water resistance is decreased. Therefore the reduction of the sulphinate content is an advantage.

The novel process is advantageous in that it can be easily practiced, and provides mixtures of monomers and polymers which can readily be processed, which do not become crumbly but remain plastic. The polymers are absolutely stable in color; in particular, they have no tendency to yellow and exhibit a particularly high resistance against ultraviolet radiation, which distinguishes these polymers favorably from those prepared with the known contaminated sulfinic acids. Moreover, the polymers possess an outstanding and durable gloss and may be highly polished. Furthermore, they have a high adhesive power, which is especially valuable in the preparation of fillings for teeth.

The polymers prepared by using quaternary ammonium salts and small amounts of sulfinate, or by using a sulfinic acid salt of a quaternary ammonium base, are moreover, distinguished by their particularly good resistance against the effects of heat and moisture, the latter effect being especially improved by the further addition of a methacrylate of a polyhydric alcohol.

Besides the additives to the monomer-polymer-system, which can be used within the scope of the invention, and are responsible for the advantages of this process, other, heretofore, used additives which are not, by themselves, part of the invention, may also be used. It is, for instance, preferred to protect the monomeric methacrylic acid methyl ester against premature polymerization by the addition of small amounts of stabilizing agents, such as hydroquinone. Fillers such as relatively insoluble white carbonates and/or coloring matter, e.g. titanium dioxide or cadmium red (for instance 0.1% for denture material)

may be added to the pulverized polymer in order to obtain the desired color for artificial teeth, dentures and fillings.

The following examples serve to illustrate the invention:

Example 1

In 100 g. of methyl ester of methacrylic acid which has been stabilized by 0.0001 g. of hydroquinone are dissolved 2.3 g. of anhydrous phosphoric acid. 0.1 g. of calcium benzenesulphinate and 0.1 g. of sodium chloride, both in the form of powder, as well as 0.001 g. of titanium white are added to 2 g. of powder of methylester of polymethacrylic acid. So much of the first mentioned solution is stirred into this mixture of powders that a thinly liquid paste is obtained. By means of a brush this paste is inserted into a prepared cavity. The filling hardens in about 4 minutes; it is odontologically and esthetically perfect.

Example 2

In 100 g. of methyl ester of methacrylic acid which has been stabilized by 0.0001 g. of hydroquinone are dissolved 0.9 g. of phosphoric acid and 2.8 g. of cetyl-trimethyl-ammonium-chloride. 0.1 g. of celcium benzenesulphinate and 0.05 g. of potassium chloride as well as 0.005 g. titanium white are ground with 10 g. polymethacrylic acid methyl ester. So much of the first mentioned solution is stirred into this mixture of powders that a thinly liquid paste is obtained which may be used as described in Example 1 for the preparation of a light-resisting tooth filling. Hardening is terminated in about 4 minutes.

Example 3

100 g. of powder of methyl ester of polymethacrylic acid are thoroughly mixed with 5 g. of stontrium benzenesulphinate and 5 g. of sodium chloride. 1.15 g. of phosphoric acid are dissolved in 100 g. of methacrylic acid methyl ester (stabilized). Solution and mixture of powders are kneaded to form a paste-like dental cement which, brought in a form, is completely polymerized in 20 minutes.

Example 4

A mixture is prepared of 1500 g. of methyl ester of polymethacrylic acid (in the form of powder), 7.5 g. of calcium benzenesulphinate, 3.5 g. of stearyl-dimethyl-benzyl-ammonium chloride, 0.5 g. titanium dioxide and 0.8 g. cadmium red. In 2000 g. of methyl ester of monomethacrylic acid stabilized by hydroquinone are dissolved 8.5 g. of phosphoric acid. So much of this solution is stirred into the first mentioned mixture of powders that a still easily formable plastic mass is obtained. The mass thus obtained is filled at room temperature into a mold suitably prepared for producing a dental prosthesis, wherein it hardens within about 15 minutes.

Example 5

100 g. of methyl ester of polymethacrylic acid are mixed with 5 g. of calcium benzenesulphinate, 2 g. of strontium benzenesulphinate, 3 g. of potassium chloride and 2 g. anhydrous sodium sulphate. 1.5 g. of phosphoric acid are dissolved in 100 g. of methyl ester of monomethacrylic acid, stabilized by 0.0001 g. of hydroquinone. So much of this solution is stirred into the first mentioned mixture of powders that a thinly liquid paste is produced which is polymerized without the application of heat in molds or, for the preparation of a tooth filling, in the prepared tooth cavity. Hardening is terminated in 15 minutes and yields a well polishable, lustrous polymer.

Example 6

150 g. of pulverulent methyl ester of polymethacrylic acid are mixed with 0.75 g. of calcium benzenesulphinate and 0.3 g. of titanium dioxide. 0.7 g. of stearyl-dimethyl-benzylammonium chloride and 0.6 g. of hypophosphorous acid are dissolved in 200 g. of methyl ester of monomethacrylic acid (stabilized). From this solution and the first mentioned mixture of powders a thinly liquid paste is prepared in the use of which for the preparation of a polymer, for instance in the form of a tooth filling, polymerization is terminated after 8 minutes.

Example 7

A mixture is prepared of 150 g. of pulverulent methyl ester of polymethacrylic acid, 0.75 g. of calcium benzenesulphinate, 0.3 g. of titanium dioxide, and 3 g. of boric acid; 0.7 g. of stearyl-dimethyl-benzyl-ammonium chloride are dissolved in 200 g. of methyl ester of monomethacrylic acid which has been stabilized by hydroquinone. So much of this solution is stirred into the first mentioned mixture of powder that a thinly liquid paste is produced. When using the same for the preparation of a polymer hardening is terminated in 12 minutes.

Example 8

In 100 g. of methyl ester of methacrylic acid which has ben stalizide by 0.0001 g. of hydroquinone are dissolved 1.6 g. of phosphoric acid. 10 g. of calcium benezenesulphinate and 10 g. of ammonium chloride, both in the form of powder, are admixed to 200 g. of pulverulent methyl ester of polymethacrylic acid. A paste made of this mixture of powders and the first mentioned solution hardens in 9 minutes without the application of heat.

Example 9

150 g. of pulverulent methyl ester of polymethacrylic acid are mixed with 0.75 g. of calcium benzenesulphinate, 0.4 g. of titanium dioxide and 0.5 g. of diisobutyl - phenoxy - ethoxy - ethyl - dimethyl - benzyl-ammonium chloride. After the dissolving of 0.5 g. of phosphoric acid and 0.4 g. of diisobutyl-phenoxy-ethoxy-ethyl-dimethyl-benzyl-ammonium chloride in 200 g. of methyl ester of monomethacrylic acid, stabilized by hydroquinone, so much of this solution is stirred into the above mixture of powders that a plastic, formable mass is produced. When using the same for the preparation of a polymer in a suitable mold, hardening is terminated in 8 minutes, without the application of heat.

Example 10

A solution of methacrylic acid methyl ester, containing 2 percent benzene sulfinic acid, is mixed with 2.5 percent of a 20 percent aqueous solution of diisobutyl-phenoxyethoxy - ethyl - dimethylbenzyl - ammonium-hydroxide. This mixture is mixed with an amount of polymethacrylic acid methyl ester-powder so that a paste is formed, which can readily be processed. Polymerization starts already at a room temperature of 18° C. and is finished after 8 minutes. The polymerisate thus obtained is hard, glossy and to a high degree fast to light. An analogous mixture without the addition of the above quaternary base is still soft after 50 minutes, if trying to pulverize it at a room temperature of 18° C.

Example 11

A solution of methacrylic acid methyl ester, containing 2 percent benzenesulfinic acid and 0.5 percent stearyl-dimethylbenzyl-ammoniumchloride is mixed with an amount of polymethacrylic acid methyl ester-powder, so that a paste is formed, which can readily be processed. The polymerization starts already at a room temperature of 18° C. and is finished after 8 minutes. The polymerisate thus obtained is hard, glossy and to a high degree fast to light. An analogous mixture without the addition of the above quaternary ammonium chloride is still soft after 50 minutes if trying to polymerize it at a room temperature of 18° C.

Example 12

A mixture is prepared of 1500 g. polymethacrylic acid methyl ester, 7.5 g. ammonium benzenesulfinate and 3 g. titanium dioxide. In 2000 g. methacrylic acid methylester, stabilized with hydroquinone, 7 g. stearyldimethylbenzylammonium chloride and 8.5 g. phosphoric acid are dissolved. Such an amount of this solution is stirred into the first named powder mixture as to form a material, which is still well kneadable. The hardening of this mixture, which takes about 7 minutes, results in a white, slightly transparent polymer, which makes the composition appear excellently suitable for the preparation of fillings.

*Example 13*

A mixture is prepared of 1500 g. polymethacrylic acid methyl ester, 7.5 g. of the calcium salt of the lauryl sulfinic acid and 3 g. titanium dioxide. In 2000 g. methacrylic acid methyl ester, stabilized with hydroquinone, 7 g. diisobutyl-phenoxy-ethoxyethyl-dimethylbenzyl-ammoniumchloride and 12 g. methacrylic acid and 8.5 g. phosphoric acid are dissolved. So much of this solution is stirred into the first named powder mixture as to form a material, which is still kneadable. This material hardened in about 5 minutes at a room temperature.

*Example 14*

In 100 g. methacrylic acid methyl ester, stabilized with 0.0001 g. hydroquinone, 1.2 g. hypophosphorous acid and 1 g. tributylstearylammoniumchloride are dissolved. 2 g. polymethacrylic acid methylester-powder are admixed with 0.02 g. of the calcium salt of the benzenesulfinic acid and 0.015 g. sodium chloride, both in the form of a powder, and with 0.004 g. titanium dioxide. Such an amount of the first named mixture is stirred into the mixture of powders as to form a thinly liquid paste. By means of a small brush this paste is placed into a prepared dental cavity. The filling hardens within approximately 4 minutes; it is unobjectionable from the odontological and the aesthetic point of view.

*Example 15*

In 100 g. methacrylic acid methyl ester, containing 0.0001 g. hydroquinone, 0.9 g. diisobutyl-phenoxyethoxyethyldimethylbenzyl-ammoniumbenzosulfinate are dissolved. Such an amount of this solution is added to a mixture prepared by triturating 1 g. polymethacrylic acid methyl ester and 0.002 g. titanium dioxide, as to form a creamy paste. This paste is applied by a brush into a prepared cavity. After about 7 minutes the material has hardened, may at once be polished and is unobjectionable from the odontological point of view.

*Example 16*

A mixture is prepared of 150 g. polymethacrylic acid methyl ester 1.5 g. of the sodium salt of laurylsulfinic acid and 0.3 g. titanium dioxide. In 200 g. methacrylic acid methyl ester (stabilized with hydroquinone) 0.72 g. N,N' - ethylene - bis - spirocyclohexyl - ethyleneiminedihydrochloride (M.P 278° C.) and 0.85 g. phosphoric acid are dissolved. Such an amount of this solution is then stirred into the first named powder mixture as to form a well kneadable material. At room temperature this material hardens within about 10 minutes.

Similarly good results are obtained, if 0.72 g. N-ethyl-N - benzyl - spirocyclohexyl - ethyleneimoniumchloride (M.P. 216° C.) are used instead of the above ethyleneiminedihydrochloride.

*Example 17*

A mixture is prepared from 150 g. polymethacrylic acid methylate 0.75 g. of the calcium salt of para-toluenesulfinic acid and 0.3 g. titanium dioxide. 0.72 g. N-benzyl - N - dodecyl - spirocyclohexylethyleneimoniumbromide (M.P. 246° C.), 1.2 g. methacrylic acid and 0.85 g. phosphoric acid are dissolved in 200 g. methacrylic acid methyl ester, stabilized with hydroquinone. Such an amount of the solution is stirred into the first named mixture as to result in a well kneadable mixture. At room temperature this mixture hardens within about 10 minutes.

*Example 18*

A solution of methacrylic acid methyl ester, containing 2 percent of benzenesulfinic acid and 0.5 percent stearyldimethylbenzylammoniumchloride is mixed with such an amount of polymethacrylic acid methyl ester-powder as to form a paste, which can easily be processed. At a room temperature of only 20° C. the polymerization starts at once and takes 8 minutes. The polymer thus obtained is completely hard, glossy, and fast to light. An analogous mixture without the addition of the above ammonium salt is still soft after 50 minutes, if trying to polymerize it at 20° C.

*Example 19*

In 2000 g. methacrylic acid methyl ester, stabilized with hydroquinone, 40 g. benzene sulfinic acid and 40 g. diisobutylphenoxyethoxyethyl-dimethylbenzyl-ammoniumchloride are dissolved. This mixture is polymerized at a temperature of 30° C. The polymerization is completely finished after 55 minutes, whereas when trying to polymerize a similar mixture without the addition of the ammonium salt, no polymerization has taken place after the same time.

*Example 20*

100 parts (by weight) of methacrylic acid methyl ester, 2 parts of benzene sulfinic acid and 2 parts of stearyldimethylbenzylammoniumchloride are brought into 500 parts of water containing 6 percent of gelatine, and are emulsified therein. Polymerization at 80° C. results after one hour in a polymer in the form of small pearls.

*Example 21*

1500 g. polymethacrylic acid methylester are mixed with 7.5 g. of calcium para-toluenesulfinate and 3 g. titanium dioxide. In 1800 g. methacrylic acid methylester, stabilized with hydroquinone, 200 g. of the glycol ester of methacrylic acid, 7 g. diisobutyl-phenoxyethoxyethyl-dimethylbenzyl-ammoniumchloride, 12 g. methacrylic acid and 8.5 g. phosphoric acid are dissolved. After stirring this solution into the first named powder mixture in such amounts as to obtain a kneadable paste, this paste can be hardened at room temperature in about 6 minutes.

*Example 22*

When using instead of an addition of about 10 percent of the glycol ester of methacrylic acid (based upon the amount of monomer methacrylic acid methylester) either 8 percent of the glycerine ester or 7 percent of the pentaerythrite ester of methacrylic acid or 7 percent of the sorbitol ester of methacrylic acid and working otherwise as described in Example 21, the same favorable results are obtained.

I claim:

1. A polymerization process which comprises mixing a polymerizable methacrylic acid ester with a compound of the formula R.SOO.X wherein R is a member of the group consisting of aromatic and saturated aliphatic hydrocarbon radicals and X represents a member of the group consisting of hydrogen, an alkali metal, NH$_4$, and an alkaline earth metal connected with its second bond to a second group R.SOO— wherein R has the same meaning as above, in the presence of a member of the group consisting of quaternary ammonium bases and quaternary ammonium salts.

2. A polymerization process which comprises mixing a monomeric methacrylic acid ester with a pulverulent methacrylic acid ester polymer and then polymerizing the mixture, the polymerization being carried out in the presence of a compound of the formula R.SOO.X wherein R is a member of the group consisting of aromatic and saturated aliphatic hydrocarbon radicals and X is a member of the group consisting of hydrogen, an alkali metal, NH$_4$, and an alkaline earth metal connected with its second bond to a second group R.SOO— wherein R has the same meaning as above, and in the presence of a member of the group consisting of quaternary ammonium bases and quaternary ammonium salts.

3. The process of polymerizing a monomeric methacrylic acid methyl ester in the presence of pulverulent methacrylic acid methyl ester polymer, the process being carried out in the presence of a compound of the formula R.SOO.X wherein R is a member of the group consisting of aromatic and saturated aliphatic hydrocarbon radicals and X represents a member of the group consisting of hydrogen, an alkali metal, $NH_4$, and an alkaline earth metal connected with its second bond to a second group R.SOO— wherein R has the same meaning as above, and in the presence of a member of the group consisting of quaternary ammonium bases and quaternary ammonium salts.

4. The process of claim 3 wherein the polymerization reaction is carried out in the presence of an acid of the group consisting of phosphoric acid, hypophosphorous acid and boric acid.

5. The process of claim 3 wherein the reaction is carried out in the presence of free methacrylic acid.

6. The process of claim 3 wherein the reaction is carried out in the simultaneous presence of an acid of the group consisting of phosphoric acid, hypophosphorous acid and boric acid and in the simultaneous presence of free methacrylic acid.

7. The process of claim 3 wherein the reaction is carried out in the presence of an acid of the group consisting of phosphoric acid, hypophosphorous acid and boric acid, and in the presence of the methacrylic acid ester of a polyhydric alcohol of the group consisting of glycol, glycerine, pentaerythrite and sorbitol.

8. The process of claim 3 wherein the reaction is carried out in the presence of free methacrylic acid, as well as in the presence of the methacrylic acid ester of a polyhydric alcohol of the group consisting of glycol, glycerine, pentaerythrite and sorbitol.

9. The process of claim 3 wherein the reaction is carried out in the presence of an acid of the group consisting of phosphoric acid, hypophosphorous acid and boric acid, as well as in the presence of free methacrylic acid, and in the presence of the methacrylic acid ester of a polyhydric alcohol of the group consisting of glycol, glycerine, pentaerythrite and sorbitol.

10. The process of claim 3 wherein the reaction is carried out in the presence of an acid of the group consisting of phosphoric acid, hypophosphorous acid and boric acid, as well as in the presence of free methacrylic acid, and in the presence of a salt of the group consisting of the sulphates and chlorides of sodium, potassium and ammonium, and in the presence of the methacrylic acid ester of a polyhydric alcohol of the group consisting of glycol, glycerine, pentaerythrite and sorbitol.

References Cited in the file of this patent
UNITED STATES PATENTS

| | | |
|---|---|---|
| 2,567,803 | Castan et al. | Sept. 11, 1951 |
| 2,768,156 | Bredereck et al. | Oct. 23, 1956 |